(12) United States Patent
Takanuki et al.

(10) Patent No.: US 7,335,272 B2
(45) Date of Patent: Feb. 26, 2008

(54) METHOD OF MANUFACTURING A MAGNETIC HEAD AND MAGNETIC HEAD MANUFACTURING APPARATUS

(75) Inventors: Kazuaki Takanuki, Tokyo (JP); Osamu Shindo, Tokyo (JP); Akimasa Nakao, Tokyo (JP); Satoshi Yamaguchi, Tokyo (JP)

(73) Assignees: SAE Magnetics (H.K.) Ltd., Shatin (HK); TDK Corporation, Tokyo (JP)

( * ) Notice: Subject to any disclaimer, the term of this patent is extended or adjusted under 35 U.S.C. 154(b) by 179 days.

(21) Appl. No.: 10/996,432

(22) Filed: Nov. 26, 2004

(65) Prior Publication Data
US 2005/0121133 A1  Jun. 9, 2005

(30) Foreign Application Priority Data
Dec. 9, 2003  (JP) .............................. 2003-409911

(51) Int. Cl.
*B32B 41/00* (2006.01)
(52) U.S. Cl. ........................ 156/64; 156/351; 156/356; 156/357; 156/360; 156/378; 156/379
(58) Field of Classification Search .................. 156/64, 156/351, 356, 357, 360, 378, 379
See application file for complete search history.

(56) References Cited

U.S. PATENT DOCUMENTS 4,964,941 A  * 10/1990  Von Brandt et al. ........ 156/360

6,284,073 B1 * 9/2001 Nemoto et al. ............... 156/64

FOREIGN PATENT DOCUMENTS

JP  03-091173  * 4/1991
JP  4-17174  1/1992

* cited by examiner

*Primary Examiner*—George Koch
(74) *Attorney, Agent, or Firm*—Oblon, Spivak, McClelland, Maier & Neustadt, P.C.

(57) ABSTRACT

After photographing a surface on which an ABS is formed, and the outer shape of a slider, the ABS and an engraved region formed within the ABS are identified from a photographed image. A reference that becomes a guide for attaching to a suspension is then computed, and a positional relationship between the reference and the outer shape of the slider is stored as association information. Next, the outer shape of the slider is measured, and measured values are compared to the association information and a reference is read out when attaching the slider to the suspension. An adhesive is discharged, from below, onto a suspension attachment surface of the slider based on the reference. The slider may then be attached to the suspension while holding the slider in a state where the ABS is positioned on an upper side of the slider.

3 Claims, 4 Drawing Sheets

METHOD OF MANUFACTURING A MAGNETIC HEAD AND MAGNETIC HEAD MANUFACTURING APPARATUS

BACKGROUND OF THE INVENTION

1. Field of the Invention

The present invention relates to a method of manufacturing a magnetic head, and to a magnetic head manufacturing apparatus. In particular, the present invention relates to a method of manufacturing a magnetic head, and to a magnetic head manufacturing apparatus, suitable for post mounting of a slider onto a suspension.

2. Related Background Art

Hard disk drives (hereinafter called HDDs) are increasing in capacity and are being made thinner. Together with these advances, magnetic heads (20%, 30% sliders) are also being made smaller.

When bonding a slider, on which a giant magneto-resistive (GMR) element is formed, to a suspension side with conventional processes of manufacturing magnetic heads, positioning of the slider is performed first using the external shape of the slider as a reference. An adhesive agent is applied to a rear surface side of the slider (side opposite to a side where an air bearing surface (ABS) is formed) after positioning the slider, and the rear surface side of the slider is made to contact distal ends of the suspensions, which have been positioned by using a tooling hole. The rear surface side of the slider and the distal ends of the suspensions are bonded through the adhesive. It should be noted that a suction nozzle slightly smaller than the surface area of the slider is generally used in moving the slider to the distal ends of the suspensions.

After bonding the slider and the suspension, thus forming a head gimble assembly (HGA), the HGA is assembled together with an actuator block, forming a head stack assembly (HAS, refer to JP 4-17174 A, FIGS. 4 and 5, for example).

However, problems like those described below exist with the conventional magnetic head manufacturing methods described above.

Namely, the processing time is long for the slider because the slider undergoes a process for assembling the HSA after undergoing a process for assembling the HGA. A danger thus exists that elements within the slider will be damaged due to electrostatic discharge (ESD) or the like. When a non-defective slider at the HGA assembly state becomes defective during processing, the defects in the slider are discovered after HSA assembly. Finished product yield consequently decreases, and there are cost increases.

Methods in which the slider is post mounted have been considered in order to resolve problems like those described above. However, a pair of suspensions that sandwich a magnetic disk face each other in the HSA. With a method in which attachment of the slider is performed from a vertical direction by using a conventional suction nozzle, there is a problem in that the suction nozzle interferes with the other facing suspension, and the slider thus cannot be attached.

In addition, when the slider is post mounted, contact surfaces are positioned on inner sides that face each other through a narrow gap in the pair of suspensions that are attached to an actuator block. Consequently, an adhesive cannot be applied by a conventionally used syringe or needle. Accordingly, it is necessary to apply the adhesive to the rear surfaces of the slider, not to the suspensions. However, the surfaces of the slider to which the adhesive is applied (namely, the rear surfaces) are opposite to the ABS.

It is thus necessary to invert the orientation of the slider when applying the adhesive, and to return the slider to its original orientation when mounting the slider. However, operations to invert the slider lead to a manufacturing apparatus become complex, and the amount of slider handling operations increases. Consequently a risk that elements within the slider will be damaged due to ESD becomes greater.

SUMMARY OF THE INVENTION

The present invention focuses on conventional problems like those described above. An object of the present invention is to provide a method of manufacturing a magnetic head, and a magnetic head manufacturing apparatus, capable of post mounting a slider onto a distal end of a suspension without inverting the orientation of the slider.

The present invention is based on knowledge that post mounting of a slider can be performed, without inverting the orientation of the slider, provided that a surface of the slider on which an ABS is formed is photographed, an attachment position (reference) for a suspension is computed from a photographed image, an adhesive is then discharged to a position on a rear surface side of the slider that is computed based on information for the attachment position, and attachment to the suspension is performed by the adhesive.

According to one aspect of the invention, there is provided a method of manufacturing a magnetic head in which a slider, on which an air bearing surface (ABS) is formed, is attached to a suspension, the method including: photographing an upper side surface on which the ABS is formed, and an outer shape of the slider; identifying the ABS and an engraved region formed within the ABS from a photographed image, and computing a reference that becomes an attachment guide for the suspension; storing a positional relationship between the reference and the outer shape of the slider as association information; measuring the outer shape of the slider from below the slider when attaching the slider to the suspension; comparing a measured value with the association information and reading out a reference; discharging an adhesive onto a surface of the slider on which the suspension is to be attached, based on the reference; and attaching the slider to the suspension while maintaining a state where the ABS is positioned on the upper side.

In a further aspect of the method of manufacturing a magnetic head, conveying of the slider is performed by using a gripping mechanism, both side surfaces of the slider are gripped by pressing surfaces formed on the gripping mechanism, a horizontal orientation of the slider is regulated by contacting the ABS of the slider to a horizontal regulating surface formed on the gripping mechanism, and the slider is moved to a distal end of the suspension while held by the gripping mechanism.

According to another aspect of the invention, there is provided a magnetic head manufacturing apparatus that attaches a slider, on which an air bearing surface (ABS) is formed, to a suspension, the apparatus including: a first camera that is disposed above the slider, and that photographs a surface on which the ABS is formed and an outer shape of the slider; a second camera that is disposed below the slider, and that photographs the outer shape of the slider; adhesive dispensing means capable of dispensing an adhesive, from below, onto a surface of the slider to which the suspension is to be attached; the suspension held with an orientation so that it is possible to attach the slider in a state where the ABS is positioned on an upper surface of the slider; a slider conveying pathway on which the slider is conveyed, along which the first camera, the second camera, the adhesive dispensing means, and the suspension are disposed in order; a gripping mechanism made from a two block structure of two block members, in which the two block members are capable of sliding with respect to each other, a pressing surface is formed on each of the block members, a horizontal regulating surface that contacts the ABS of the slider is formed on one of the block members, and in which the gripping mechanism is provided capable of moving along the slider conveying pathway; image processing means that identifies the ABS, and the engraved region formed within the ABS, that are photographed by the first camera; and coordinate computing means that computes a reference that becomes a guide for attaching the suspension, the computation made from identification information from the image processing means and from information from the second camera, and that stores a positional relationship between the reference and the outer shape of the slider as association information.

In further aspect of the magnetic head manufacturing apparatus, the first camera is preferably a ultraviolet (UV) light detecting camera that photographs UV light from a UV light source that reflects from the slider, and bevel portions are preferably formed in edge portions of the pressing surfaces, decreasing the reflectivity of the block members disposed on both sides of the bevel portions, and the slider.

According to the configuration described above, after disposing a slider on a holding table by using a gripping mechanism, for example, so that an ABS side of the slider becomes an upper surface, a first camera photographs the ABS side of the slider. The ABS and an engraved region are then identified from a photographed image by using an image processing means. In general, the ABS is a smooth surface due to polishing, while on the other hand, the engraved region has a rough surface due to ion milling. Consequently, the engraved region and the ABS can be easily identified from the image provided that binarization processing or the like is performed based on a difference in the amount of light reflected from the engraved region and the ABS when photographing. After processing is performed and different regions are identified, the gripping mechanism again grips the slider from the holding table, and a reference point in a suspension attachment surface (in other words, an attachment position to the suspension) is computed from the different regions and from an image from a second camera by using a coordinate computing means.

After thus computing the reference point on the suspension attachment surface, the slider is moved by the gripping means to a position above an adhesive discharging means, based on coordinate information for the reference point. An adhesive is then discharged from the adhesive discharging means on to the reference point on the suspension attachment surface.

After the adhesive is discharged to the position computed from a standard surface of the suspension attachment surface, the gripping mechanism again moves the slider to a distal end of the suspension along a slider conveying pathway. It then becomes possible to attach the slider to the distal end of the suspension provided that the gripping mechanism is moved downward. The orientation of the slider is thus set so that the ABS is on the upper side, and the slider can be moved along the conveying pathway in a state where a fixed orientation is maintained. Accordingly, complex operations and complex processes for inverting the orientation are unnecessary, and damage to elements within the slider due to ESD and the like can be prevented.

It should be noted that a step between the ABS and the engraved region that is difficult to detect by using visible light can be reliably detected provided that ultraviolet light (UV light) is irradiated to the ABS and the engraved region, and reflected light is captured by a UV light detecting camera, because UV light has a shorter wavelength than visible light. Accordingly, the ABS and the engraved region can be reliably identified provided that UV light irradiation is performed and that the UV light detecting camera captures the reflected light. It thus becomes possible to increase the precision of the standard.

Further, the reflectivity of light in the periphery of the slider decreases with respect to the rear surface of the slider provided that bevels are formed in edge portions of pressing surfaces of the gripping mechanism. Consequently, contours of the slider become clearer, and the external shape of the slider can be reliably ascertained by image recognition, provided that the beveled edge portions and the use of UV light are combined.

According to the present invention, there is provided a method of manufacturing a magnetic head for attaching a slider, on which an air bearing surface (ABS) is formed, onto a suspension. In this method, an upper side surface on which the ABS is formed is photographed together with an outer shape of the slider. The ABS and an engraved region formed within the ABS are next identified from a photographed image, and a reference that is an attachment guide for the suspension are computed. A positional relationship between the reference and the outer shape of the slider is then stored as association information. The outer shape of the slider is then measured, the measured value is compared with the association information, and the reference is read out when attaching the slider to the suspension. An adhesive is discharged, from below, to a suspension attachment surface on the slider, based on the reference. Attachment of the slider to the suspension is then performed while maintaining a state where the ABS is positioned on the upper side. Alternatively, there is provided a magnetic head manufacturing apparatus, in which the slider on which the ABS is formed is attached to the suspension. In this apparatus, a first camera that is disposed above the slider and that photographs the surface on which the ABS is formed and the outer shape of the slider, a second camera that is disposed below the slider and that photographs the outer shape of the slider, an adhesive discharging means that is capable of dispensing an adhesive onto the suspension attachment surface of the slider from below, and the suspension in a state where the ABS is positioned on the upper side, maintaining an orientation so that attachment of the slider is possible, are disposed in sequence on a conveying pathway of the slider. A gripping mechanism made from two block structure members, where the two block members are capable of sliding with respect to each other and where a pressing surface is formed on each of the two block members, is moveably provided along the conveying pathway. A horizontal regulating surface that contacts the ABS of the slider is formed on one of the block members. One image processing means that identifies the ABS, and the engraved region formed within the ABS, from the image photographed by the first camera, and another image processing means that computes a reference, which becomes a guide for attaching the suspension, from identification information from the one image processing means and from the second camera, and then stores a positional relationship between the reference and the outer shape of the slider as association information, are connected to the adhesive discharging means and the gripping means. Accordingly, it becomes possible to post mount a slider to a distal end of a suspension without inverting the orientation of the slider, and damage to elements within the slider due to ESD and the like can be prevented.

DESCRIPTION OF THE PREFERRED EMBODIMENTS

Preferred specific embodiments of a method of manufacturing a magnetic head, and a magnetic head manufacturing apparatus, according to the present invention are explained in detail below with reference to the appended drawings.

Figure 1:
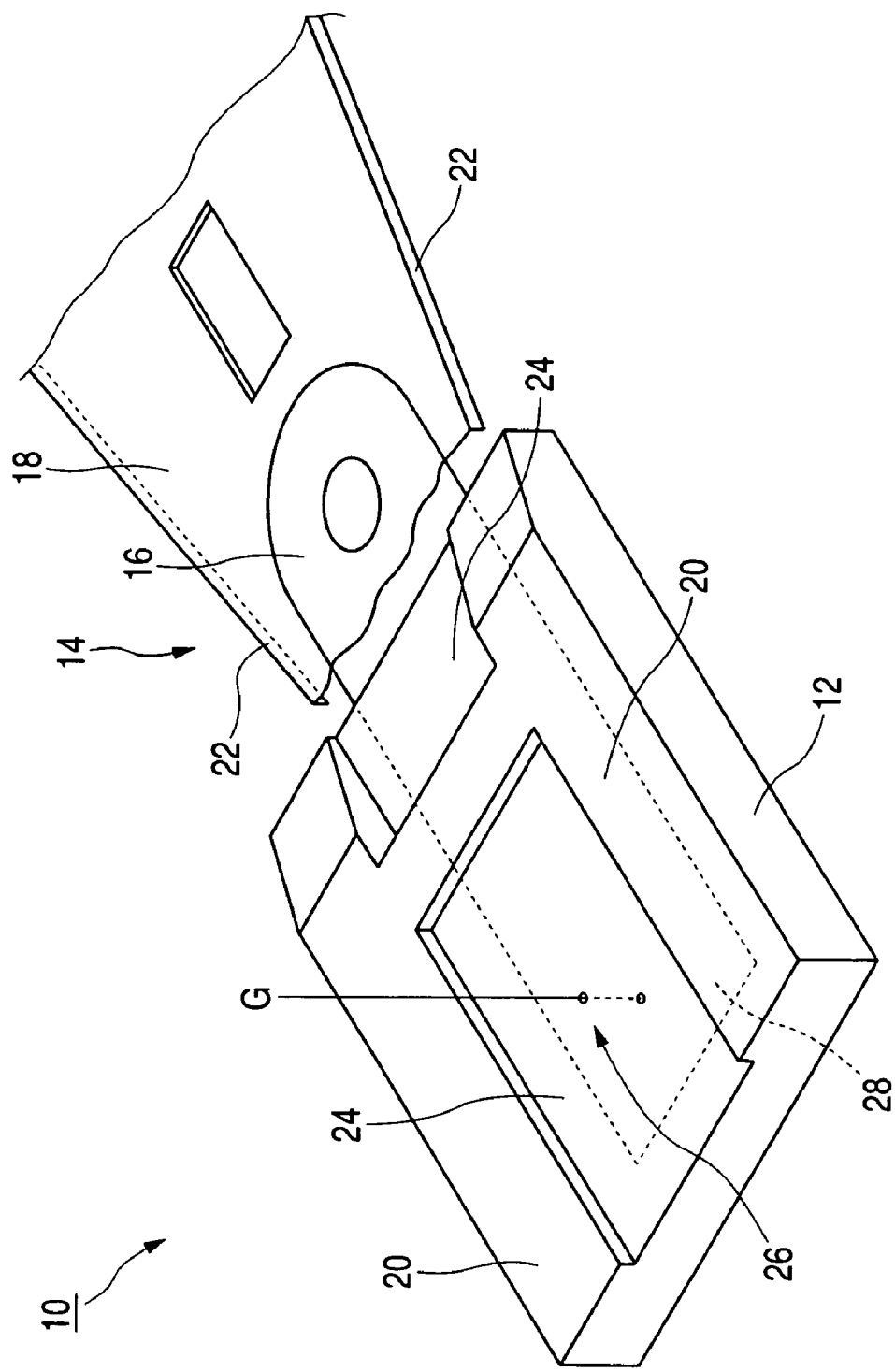
FIG. 1 is a perspective view of a magnetic head manufactured by using a method of manufacturing a magnetic head according to an embodiment of the present invention.

FIG. 1 is a perspective view of a magnetic head manufactured by using a method of manufacturing a magnetic head according to an embodiment of the present invention. Referring to FIG. 1, a magnetic head 10 that is manufactured by using the method of manufacturing a magnetic head according to this embodiment includes a slider 12 in which a giant magneto-resistive (GMR) element is incorporated, and a suspension 14 that is fixed to the slider 12. The suspension 14 includes a flexure 16 that is bonded and fixed to the slider 12, a load beam 18 that is connected to the flexure 16 by spot welding, and a flexible printed circuit (FPC, not shown) that provides wirings for the GMR element that is formed on the slider 12.

An ABS 20 is formed on a side of the slider opposed to a magnetic disk (not shown) that is fixed to a spindle motor of an HDD. Positive pressure and negative pressure are generated between the slider 12 and the magnetic disk that is rotating at high speed due to the ABS 20, thus making the slider 12 fly over the magnetic disk at an arbitrary height.

Further, the flexure 16 that is bonded and fixed to the slider 12 is made from a metallic thin sheet, and can deform in an upward and downward direction, a pitch direction, and a roll direction of the slider 12. Magnetic disk surface wobble, tilting that accompanies assembly, and the like are thus absorbed.

The load beam 18 that is spot welded to the flexure 16 is made from a metallic thin sheet, similar to the flexure 16, and generates a constant load to counterbalance a lifting force on the slider 12 by a spring urging force. The slider 12 is thus pressed to a surface of the magnetic disk. It should be noted that a bent piece 22 is provided at both end portions of the load beam 18, thus ensuring rigidity with respect to a seek direction of the HDD (that is, an in-plane direction of the magnetic disk).

With the magnetic head 10 manufactured by using the method of manufacturing a magnetic head according to this embodiment, the ABS 20 and the engraved region 24 that is formed in the ABS 20 by ion milling or the like are identified by image processing, and computation is performed with a centroid G26 of the identified engraved region 24 used as a reference point (reference). A dispenser or the like is used to apply an adhesive at a position in an attachment surface 28 for the flexure 16 in the slider 12 corresponding to the centroid G26. Attachment of the flexure 16 is performed by taking the centroid G26 as a reference. Further, application of the adhesive is performed from below the attachment surface 28 for the flexure 16 when applying the adhesive by using a dispenser or the like in a process of manufacturing the magnetic head 10. The orientation of the slider 12 is thus not inverted (in other words, the ABS 20 is kept on the upper surface). Consequently, the manufacturing apparatus can be prevented from becoming complex, complex operations and complex processes for inverting the orientation become unnecessary, and elements within the slider can be prevented from being damaged.

It becomes possible to well balance positive pressure and negative pressure of the slider 12 that occur in the vicinity of the flexure 16, to stabilize the flying orientation of the slider 12, and to obtain good electrical characteristics by bonding the slider 12 and the flexure 16 (namely, the suspension 14 side) together by taking the ABS 20 and the engraved region 24, which determine the flying orientation of the slider 12, as a reference.

A procedure for manufacturing the magnetic head 10 thus configured is explained below.

Figure 2:
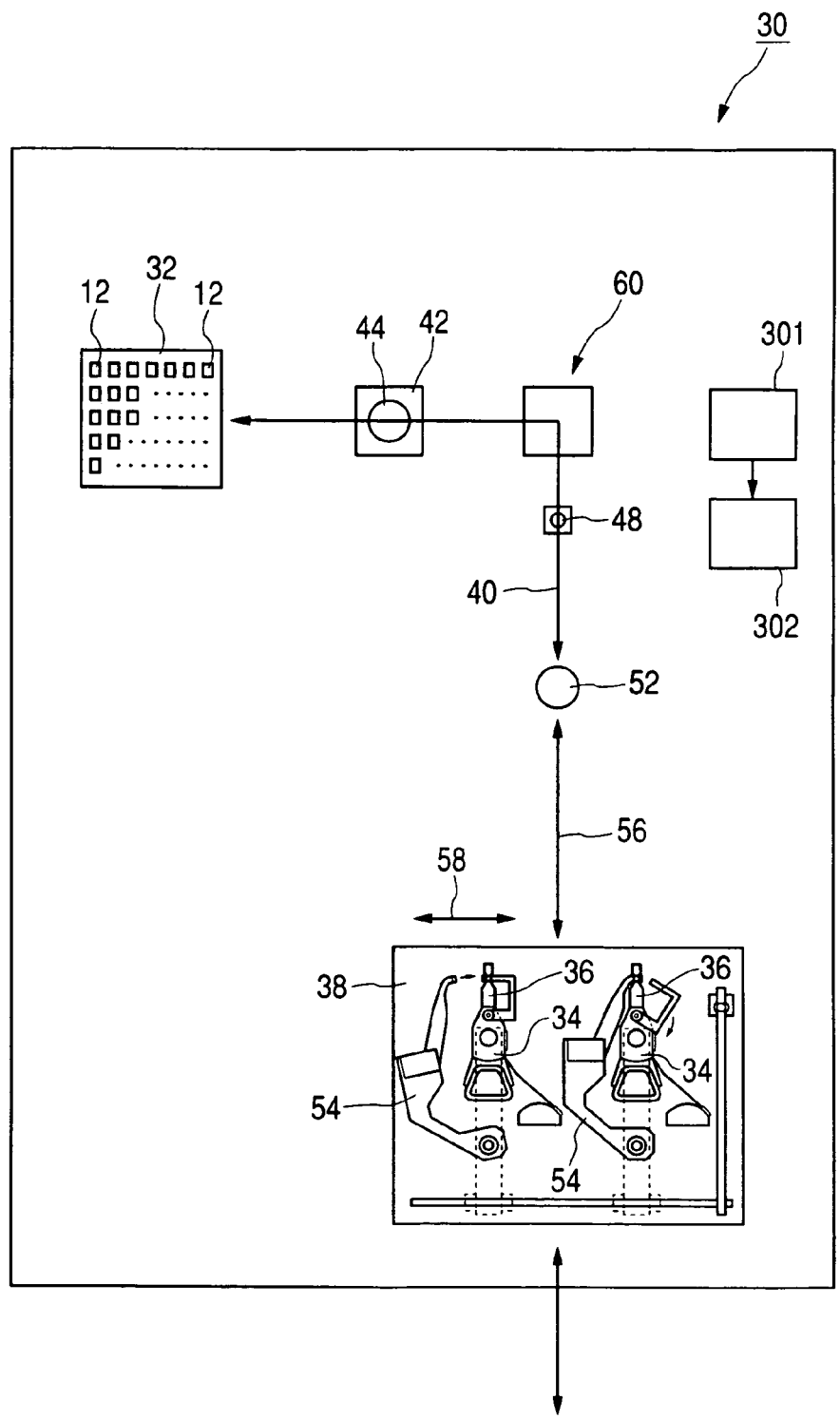
FIG. 2 is a plan view that shows a magnetic head manufacturing apparatus according to an embodiment of the present invention.

FIG. 2 is a plan view that shows the magnetic head manufacturing apparatus according to this embodiment.

Referring to FIG. 2, a conveying pathway 40 is formed in a magnetic head manufacturing apparatus 30 according to this embodiment. A tray 32 side that is capable of housing a plurality of the sliders 12 is taken as a starting end of the pathway 40, and a palette 38 that houses a suspension 36 that is attached to an actuator block 34 is taken as a finishing end. It should be noted that the ABS 20 of the slider 12 is housed in the tray 32 so as to be on an upper surface. Damage to the ABS 20 is thus prevented from occurring due to contact with a bottom surface of the tray 32 and the like.

The slider 12 is then conveyed along the conveying pathway 40. A variety of configuring members that accomplish bonding of the slider 12 and the suspension 36 are disposed along the conveying pathway 40.

The configuration members along the conveying pathway 40 are explained here.

First, a temporary holding table 42 is provided downstream of the tray 32 that is capable of housing a plurality of the sliders 12, and a single slider 12 from the tray 32 is placed on the temporary holding table 42 by an aspirating means such as a nozzle (not shown).

On the other hand, a first camera 44 is disposed above the temporary holding table 42, making it possible to photograph the outer shape of the slider 12, the ABS 20, and the engraved region 24. It should be noted that the first camera 44 is a UV light detecting camera, making it possible to take in reflected UV light that is irradiated from a UV light source 46 (shown in FIG. 5) disposed in the periphery of the first camera 44. A small step between the ABS 20 and the engraved region 24 can thus be accurately detected by using UV light, which has a short wavelength, and the first camera 44 that detects UV light. It should be noted that, although the UV light source and the UV light detecting camera that detects reflected light from the UV light source are used in this embodiment, this embodiment is not limited to using the UV light source and the UV light detecting camera. For example, a combination of a widely used visible light source (such as an LED) and a camera that detects visible light, a combination of a UV light source and a visible light detecting camera, and the like may also be applied as long as a step between the ABS 20 and the engraved region 24 can be detected.

Further, a discharging nozzle 48 serving as an adhesive discharging means is disposed downstream of the first camera 44 below the slider 12. By making the discharging nozzle 48 moveable, it becomes possible to discharge a drop 50 of an adhesive (shown in FIG. 5), and apply the adhesive to the flexure attachment surface 28 on the slider 12.

In addition, a second camera 52 is disposed downstream of the discharge nozzle 48, below the slider 12. The second camera 52 makes it possible to photograph the outer shape of the slider 12 from the flexure attachment surface 28 side.

The palette 38 that becomes the finishing end of the conveying pathway 40 is disposed downstream of the second camera 52. Two of the actuator blocks 34 with the attached suspension 36 are loaded in the palette 38 here. The suspension 36 that becomes an attachment object for the slider 12 is set at a height that is determined in advance (refer to a dimension A in FIG. 5) by insertion of a moveable arm 54. Further, the palette 38 can be moved from the finishing end of the conveying pathway 40 to a position above the second camera 52 by a driving means such as a servo motor (not shown). (Refer to an arrow 56 in FIG. 2. It is also possible for the palette 38 to be moved in a direction of an arrow 58 in FIG. 2.) By moving the palette 38, the second camera 52 can photograph the attachment reference position for the slider, which is provided on a distal end of the suspension 36.

A gripping mechanism 60 that grips the slider 12 is provided on the conveying pathway 40. Conveying of the slider 12 from the temporary holding table 42 to the second camera 52 can be performed by moving the gripping mechanism 60, as can connection of the slider 12 and the suspension 36.

Figure 3:
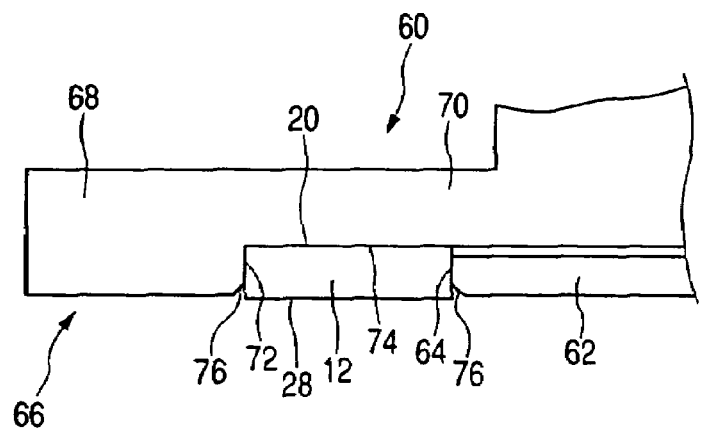
FIG. 3 is an enlargement of main portions of a gripping mechanism.

FIG. 3 is an enlargement of main portions of the gripping mechanism.

Referring to FIG. 3, the gripping mechanism 60 includes two block members, a first block and a second block, that make it possible to sandwich the slider 12.

A first projecting piece 62 is provided to the first block that structures the gripping mechanism 60. It should be noted that the first projecting piece 62 is formed having a thickness that is thinner than the thickness of the slider 12 to be gripped. The first projecting piece 62 does not interfere with the suspension 36 when gripping a side surface of the slider 12 by a first pressing surface 64 formed at a distal end of the first projecting piece 62, and attaching the slider 12 to the suspension 36.

On the other hand, a second projecting piece 66, similar to the first projecting piece of the first block, is provided to the second block that structures the gripping mechanism 60 along with the first block. It should be noted that a distal end portion 68 of the second projecting piece 66 is formed thicker than a midway portion 70 of the projecting piece 66. It is possible to grip the slider 12 by using a second pressing surface 72 provided in a portion that projects from the midway portion 70 to the distal end portion 68, and the first pressing surface 64 that is provided to the distal end of the first block. Furthermore, a horizontal regulating surface 74 is formed in the midway portion 70 on a side opposite to the ABS 20 of the slider 12. The orientation of the slider 12 can be made to follow the second block portion by making the ABS 20 of the slider 12 adhere tightly to the horizontal regulating surface 74 (the slider 12 can be gripped horizontally).

Bevel surfaces 76 are formed in edge portions of the first pressing surface 64 and the second pressing surface 72 that grip the slider 12. The reflectivity of light in the vertical direction is set to be lower for the slider 12 compared to that of the flexure bevel surface 28.

Figure 4A:
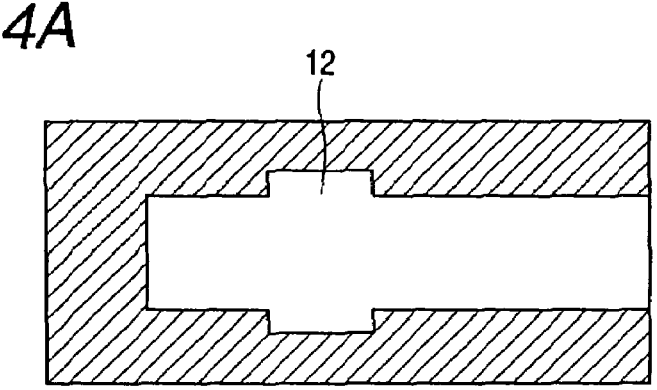
FIG. 4A is an explanatory diagram that shows changes in image recognition due to the presence or absence of a bevel portion, and shows an image where the bevel portion is not present.
Figure 4B:
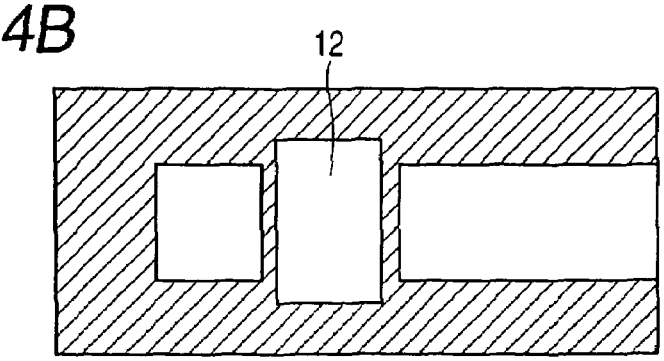
FIG. 4B is an explanatory diagram that shows changes in image recognition due to the presence or absence of a bevel portion, and shows an image where the bevel portion is present.

FIGS. 4A and 4B are explanatory diagrams that show changes in image recognition due to the presence or absence of a bevel portion. FIG. 4A is an image for a case where there is no bevel portion, and FIG. 4B is for a case where a bevel portion is present. Referring to FIGS. 4A and 4B, an edge portion boundary line of the slider 12 becomes unclear for the case where the bevel portions 76 are not present in the edge portions of the first pressing surface 64 and the second pressing surface 72, and there is a danger that the precision in detecting the position of the slider 12 thus decreases. The edge portion boundary line of the slider 12 becomes clear, however, for cases where the bevel portion 76 is present in the edge portions of the first pressing surface 64 and the second pressing surface 72 as shown in FIG. 4B. The precision in detecting the position of the slider 12 thus increases.

A procedure for attaching the slider 12 to the suspension 36 by using the magnetic head manufacturing apparatus 30 thus configured is explained.

Figure 5:
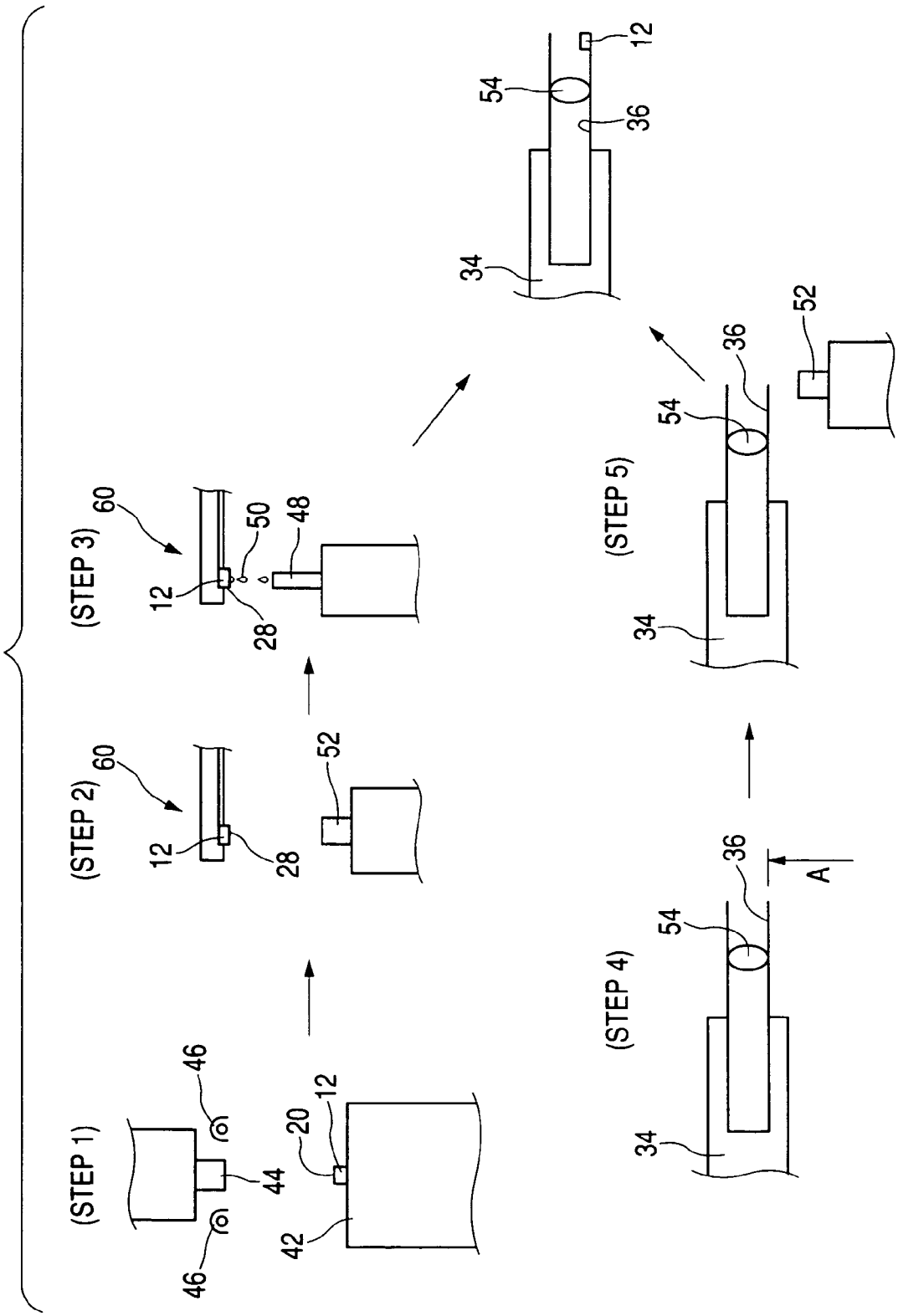
FIG. 5 is an explanatory diagram that shows processes of manufacturing a magnetic head.

FIG. 5 is an explanatory diagram that shows processes of manufacturing a magnetic head.

Referring to FIG. 5, in order to attach the slider 12 to the suspension 36, the slider 12 is first placed on the temporary holding table 42 and the ABS 20 side of the slider 12 is photographed by using the first camera 44. It should be noted that, when photographing the slider 12, the ring shape UV light source 46 disposed in the periphery of the first camera 44 may be illuminated, and light reflected from the slider 12 may be taken in by the first camera 44. In this embodiment a back light is built into the temporary holding table 42. By illuminating the back light from behind the slider 12 when the first camera 44 photographs the slider 12, the contrast of a slider edge portion increases. It thus becomes possible to increase the precision of outer shape identification of the slider 12. The outer shape of the slider 12, the ABS 20, and the engraved region 24 then undergo image processing and are identified by an image processing means 301 based on the image photographed by the first camera 44. Next, the centroid G26 of the identified engraved region 24 is computed as a reference point (reference) by a coordinate computing means 302 (Step 1).

After the first camera 44 thus photographs the slider 12, the gripping means 60 moves the slider 12 to a position above the second camera 52, and the second camera 52 performs outer shape detection of the slider 12 from a side below the slider 12. The second camera 52 is connected to the coordinate computing means 302. The slider outer shape coordinates obtained by the second camera 52 are then compared with the coordinate information obtained by the first camera 44, and the position on the flexure attachment surface 28 that corresponds to the centroid G26 is computed. This point is taken as a bonding point (Step 2).

After computing the bonding point, the gripping mechanism 60 is again moved along the conveying pathway 40, to a position above the dispensing nozzle 48. It should be noted that the gripping mechanism 60 may be made to undergo micro-motion during a bonding process. The position at which the drop of the adhesive discharged from the distal end of the discharge nozzle 48 lands on the slider 12 may thus be set to correspond with the bonding point on the slider 12 (Step 3).

It should be noted that, although the explanation above is made by taking the centroid G26 as the bonding point, the position at which the drop 50 of the adhesive lands is not limited to the centroid G26. Other positions may also be used when attaching the slider 12 to the distal end of the suspension 36, provided that the position is one at which the adhesive can reliably bond to both the slider 12 and the distal end of the suspension 36. Further, the process order of the Step 2 and the Step 3 may also be reversed to a process order of the Step 3 and then the Step 2. This may be set according to design convenience.

On the other hand, the moveable arm 54 is inserted with respect to the suspension 36 positioned on the palette 38 at the finishing end side of the conveying pathway 40, and the distal end of the suspension 36 is maintained at a height that is set in advance (the dimension A in FIG. 5) (Step 4).

The palette 38 is then moved after setting the height of the distal end of the suspension 36 to a regulated height. The distal end of the suspension 36 that becomes an attachment object for the slider 12 is moved to a position over the second camera 52, and the second camera 52 determines the reference position formed on the distal end of the suspension 36 for attaching the slider 12 (Step 5).

After completing the Step 3 on the slider 12 side and the Step 5 on the palette 38 side, the gripping mechanism 60 may be moved based on the respective coordinate positions, and the slider 12 may be attached to the distal end of the suspension 36 through the adhesive.

The adhesive can be applied to the flexure attachment surface 28, without inverting the orientation of the slider 12, through processes such as those described above. Accordingly, the structure of the manufacturing apparatus itself can be prevented from becoming complex, complex operations and complex processes for orientation inversion become unnecessary, and elements within the slider can be prevented from being damaged due to ESD and the like.

This application claims priority from Japanese Patent Application No. 2003-409911 filed Dec. 9, 2003, which is hereby incorporated by reference herein.

What is claimed is:

1. A method of manufacturing a magnetic head in which a slider, on which an air bearing surface (ABS) having an engraved region thereon is formed, is attached to a suspension, the method comprising:

photographing an upper side surface on which the ABS is formed, and an outer shape of the slider by using a first imaging device which is capable of detecting an ultraviolet (UV) light from a UV light source that reflects from the slider;

identifying the engraved region formed within the ABS from a photographed image, and computing a first reference derived from the engraved region within the ABS;

identifying the outer shape of the slider from a photographed image, and computing a second reference derived from the outer shape of the slider;

storing a positional relationship between the reference position and the second reference as association information;

identifying the outer shape of the slider from below the slider by using a second imaging device to recalculate the second reference, and comparing with the association information to read out the first reference, when attaching the slider to the suspension;

discharging an adhesive onto a surface of the slider on which the suspension is to be attached, while maintaining a state where the ABS is positioned on the upper side; and photographing the suspension from below with the second imaging device to calculate a third reference of the suspension, and bonding the slider to the suspension so that the third reference of the suspension accords to the first reference of the slider.

2. A method of manufacturing a magnetic head according to claim 1, wherein conveying of the slider is performed by using a gripping mechanism, wherein both side surfaces of the slider are gripped by pressing surfaces which are beveled and formed on the gripping mechanism, wherein a horizontal orientation of the slider is regulated by contacting the ABS of the slider to a horizontal regulating surface formed on the gripping mechanism, and wherein the slider is moved to a distal end of the suspension while held by the gripping mechanism.

3. A magnetic head manufacturing apparatus that attaches a slider, on which an air bearing surface (ABS) having an engraved region is formed, to a suspension, the apparatus comprising:

a UV light source that illuminates ultraviolet (UV) light to the slider;

a first camera that is disposed above the slider, and that detects UV light to photograph a surface on which the ABS is formed and an outer shape of the slider;

a second camera that is disposed below the slider, and that photographs the outer shape of the slider and the suspension;

a palette on which the suspension is held with an orientation so that it is possible to attach the slider in a state where the ABS is positioned on an upper surface of the slider;

adhesive dispensing means capable of dispensing an adhesive, from below, onto a surface of the slider to which the suspension is to be attached;

a slider conveying pathway on which the slider is conveyed, along which the first camera, the second camera, the adhesive dispensing means, and the palette on which the suspension are disposed in order;

a gripping mechanism made from a two block structure of two block members, wherein the two block members are capable of sliding with respect to each other, a pressing surface is formed on each of the block members, a horizontal regulating surface that contacts the ABS of the slider is formed on one of the block members, bevel portions are formed in edge portions of the pressing surface, and wherein the gripping mechanism is provided capable of moving;

image processing means that simultaneously retrieves both of image data of the slider surface on which the ABS is formed and image data of an outer shape of the slider from the first camera, calculates a first reference based on the image data of the ABS of the slider photographed by the first camera, calculates a second reference based on the image data of the outer shape of the slider photographed by the first camera, calculates a third reference based on the image data of the suspension photographed by the second camera, and recalculates the second reference based on the image data of the outer shape of the slider photographed by the second camera;

storage means that stores the first reference, the second reference, and the third reference as association information; and coordinate computing means that retrieves the first reference from the storage means based on the recalculated second reference so that based on the recalculated second reference so that the slider conveying pathway conveys the gripping mechanism while the recalculated first reference accords to the third reference.

* * * * *